(12) United States Patent
Lee et al.

(10) Patent No.: US 7,113,324 B2
(45) Date of Patent: Sep. 26, 2006

(54) IMAGE DISPLAY APPARATUS

(75) Inventors: Cheng-Kuang Lee, Taishan (TW); Chih-Yuan Wang, Gueishan (TW)

(73) Assignee: Benq Corporation, Taoyuan (TW)

( * ) Notice: Subject to any disclaimer, the term of this patent is extended or adjusted under 35 U.S.C. 154(b) by 81 days.

(21) Appl. No.: 11/053,301

(22) Filed: Feb. 8, 2005

(65) Prior Publication Data

US 2005/0179978 A1 Aug. 18, 2005

(30) Foreign Application Priority Data

Feb. 12, 2004 (TW) .............................. 93201997 U

(51) Int. Cl.
| | |
|---|---|
| *G02B 26/08* | (2006.01) |
| *G02B 26/00* | (2006.01) |
| *G03B 21/00* | (2006.01) |
| *G03B 21/14* | (2006.01) |
| *G03B 21/28* | (2006.01) |

(52) U.S. Cl. ...................... 359/298; 359/291; 359/834; 359/891; 359/237; 353/84; 353/99; 353/31; 353/97; 353/122; 348/743

(58) Field of Classification Search ................ 359/291, 359/298, 237, 242, 618, 621, 726, 831, 834, 359/837, 857, 885, 891, 892; 353/20, 31, 353/37, 70, 71, 81, 84, 94, 97–99, 121, 122; 348/743, 744, 760

See application file for complete search history.

(56) References Cited

U.S. PATENT DOCUMENTS

| | | | |
|---|---|---|---|
| 6,474,819 B1 * | 11/2002 | Yoder et al. ................... | 353/98 |
| 6,709,113 B1 * | 3/2004 | Segler et al. .................. | 353/69 |
| 6,710,909 B1 | 3/2004 | Naito | |
| 6,760,168 B1 * | 7/2004 | Lee ............................. | 359/834 |
| 6,771,325 B1 * | 8/2004 | Dewald et al. ............. | 348/743 |
| 6,779,898 B1 | 8/2004 | Wang | |
| 7,006,310 B1 * | 2/2006 | Karube et al. .............. | 359/891 |
| 7,029,130 B1 * | 4/2006 | Cannon et al. ................ | 353/97 |

* cited by examiner

*Primary Examiner*—Loha Ben
(74) *Attorney, Agent, or Firm*—Snell & Wilmer L.L.P.

(57) ABSTRACT

An image display apparatus is capable of recycling the "OFF" state light to increase the image brightness and contrast. The image display apparatus includes a light source, a spatial light modulator, a total internal reflection (TIR) prism, a projection lens set, and a reflector. The spatial light modulator selectively modulates a light beam from the light source to a first path to form a first path light beam or to a second path to form a second path light beam. The TIR prism disposed between the light source and the spatial light modulator is configured to allow the light beam to travel therethrough in a first direction and to be incident on the spatial light modulator. The projection lens set disposed between the modulator and a screen is configured to project the first path light beam to form an image on a screen. The reflector is configured to reflect the second path light beam to form a reflected light beam that is incident on the TIR prism in a second direction as a recaptured light beam. The recaptured light beam is then incident on the spatial light modulator in the first direction.

9 Claims, 3 Drawing Sheets

IMAGE DISPLAY APPARATUS

CROSS-REFERENCE TO RELATED APPLICATIONS

This application claims the right of priority based on Taiwan Patent Application No. 093201997 entitled "Image Display Apparatus", filed on Feb. 12, 2004, which is incorporated herein by reference and assigned to the assignee herein.

FIELD OF INVENTION

The present invention generally relates to an image display apparatus, and more particularly to an image display apparatus for recapturing the "off" state light thereof to enhance image brightness and contrast.

BACKGROUND OF THE INVENTION

Along with the progress of business activities and development of interactive learning, projectors have gradually become indispensable image display apparatuses in many kinds of business events and the image display technology has been advancing from the liquid crystal display to the digital light processing (DLP).

The digital light processing technology employs the reflected light, which is modulated by a spatial light modulator (SLM), such as a commonly-known digital micromirror device (DMD) that has an array of micromirrors. By controlling the tilt angle of each micromirror individually, every micromirror can be selectively arranged in two states, such as an "on" state and an "off" state. Referring to FIG. 1, a block diagram of a conventional image display apparatus is illustrated. When the light beam provided by the light source 10 travels through the integrator 20 and the filter 30 and impinges on the DMD 40, the controller 70 determines, according to image signals, the corresponding state of each micromirror. When an image signal is on, the corresponding micromirror is disposed in the on state, and the light beam is reflected to form an image on a screen 50. When the image signal is off, the corresponding micromirror is disposed in the off state, and the light beam is reflected to other direction and absorbed by the absorber 60 or converted to heat.

Brightness, resolution, weight, and lifetime of the light source are indices for determining the quality of a projector. The brightness, which indicates the intensity of light projected on a screen, especially determines whether a projector can have an effective image in a bright environment. If the brightness achieves some level, the projector can have a projected image in good quality without the need of darkening the environment or turning off the facility's light.

The light source is a component directly relating to the brightness of a projector. In general, a projector displays an image of higher brightness as the light source has greater power (or wattage). However, purely increasing the power of the light source to improve the brightness cannot improve the overall quality of a projector because, for example, a light source of greater power generates more heat, which requires a better heat dissipation mechanism, such as a larger fan. When the fan becomes larger, the noise becomes louder, and the size of the projector increases at the same time. Therefore, increasing the power of the light source to improve the image brightness must sacrifice some quality in other aspects.

Therefore, there is a need to provide an image display apparatus for improving the image brightness without inducing more problems, such as heat.

SUMMARY OF THE INVENTION

One aspect of the present invention is to provide an image display apparatus, which recaptures off-state light to enhance the image brightness. When a spatial light modulator is in the off state, at least one reflector is implemented to reflect the off-state light. The reflected off state light is guided to a total internal reflection (TIR) prism, and then recycled.

In an embodiment of the present invention, an image display apparatus includes a light source, a spatial light modulator, a total internal reflection prism, a projection lens set, and a reflector. The spatial light modulator selectively modulates a light beam, provided by the light source, along a first path to form a first path light beam or along a second path to form a second path light beam. The TIR prism is disposed between the light source and the spatial light modulator. The light beam passes through the TIR prism in a first direction and incident on the spatial light modulator. The projection lens set is disposed between the spatial light modulator and a screen and configured to project the first path light beam on the screen to form an image. The reflector is configured to reflect the second path light beam to form a reflected light beam, which is incident into the TIR prism in a second direction and reflected, as a recaptured light beam, onto the spatial light modulator in the first direction.

The image display apparatus further includes a color wheel, which is disposed between the TIR prism and the spatial light modulator. The color wheel is configured to filter light beams, such as the light beam provided by the light source or the recaptured light beam. Furthermore, the image display apparatus includes a light pipe for processing a light beam distribution. In an exemplary embodiment, the TIR prism is preferably disposed between the light source and the color wheel and selectively before or after the light pipe.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

The present invention provides an image display apparatus, which recaptures off-state light so as to improve image brightness and contrast. Two preferred embodiments of the present invention are illustrated in FIGS. 2 and 3.

Figure 1:
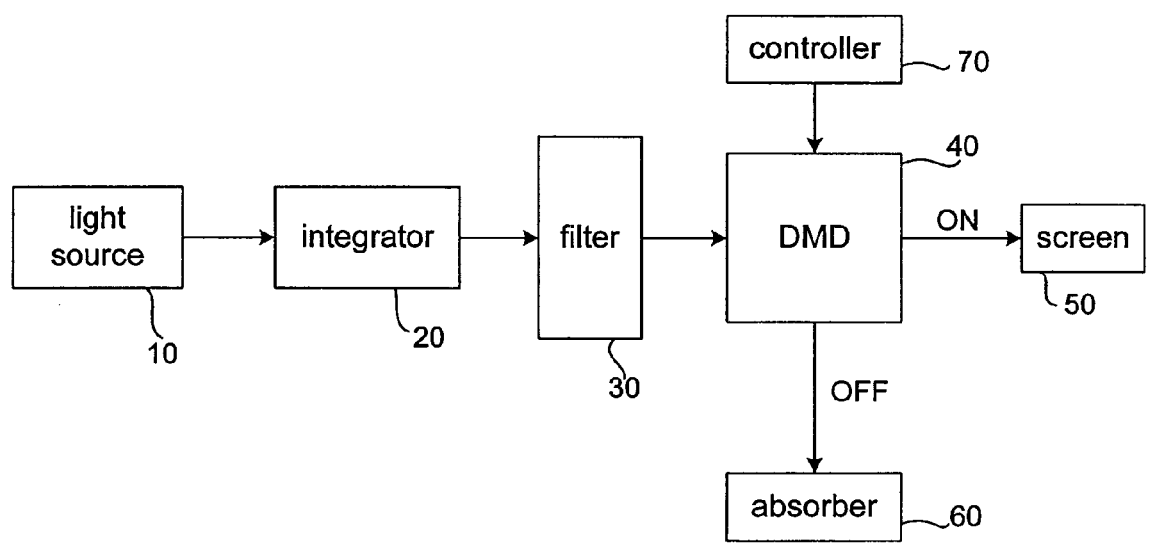
FIG. 1 is a block diagram illustrating a conventional image display apparatus.
Figure 2:
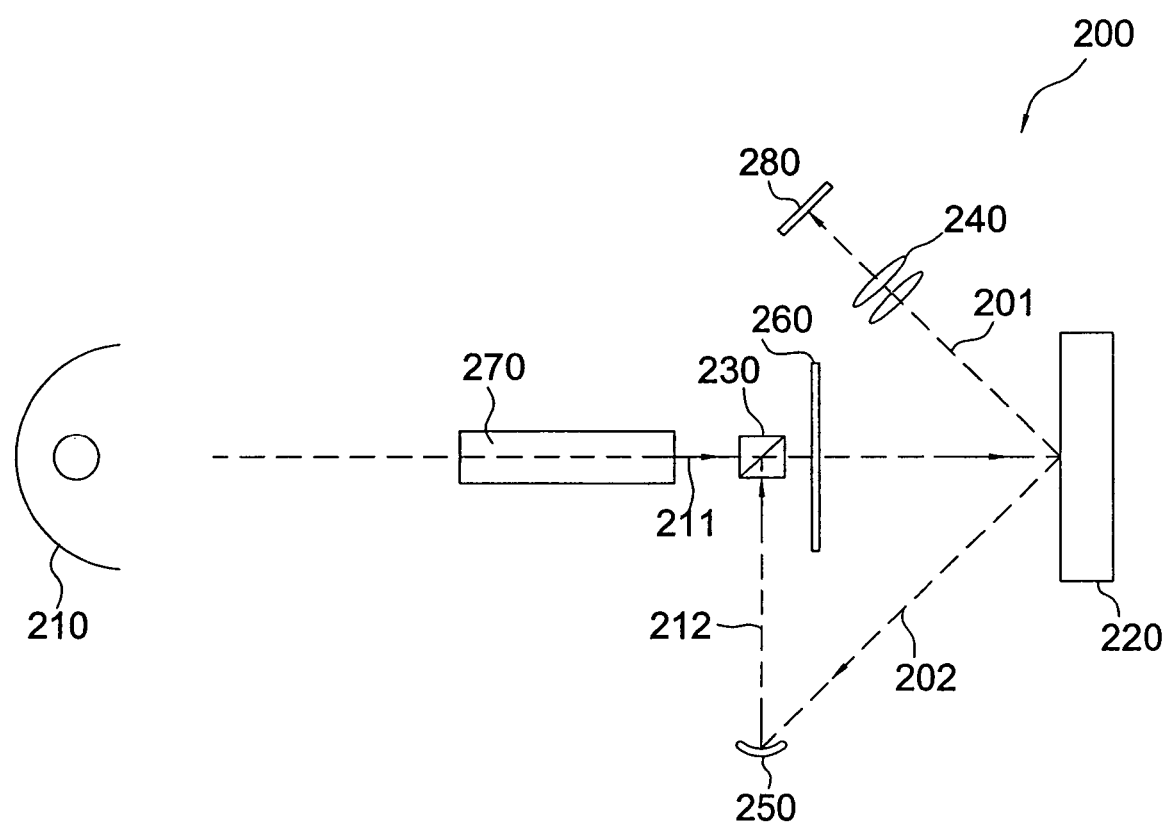
FIG. 2 is a schematic view illustrating an image display apparatus in accordance with one embodiment of the present invention.
Figure 3:
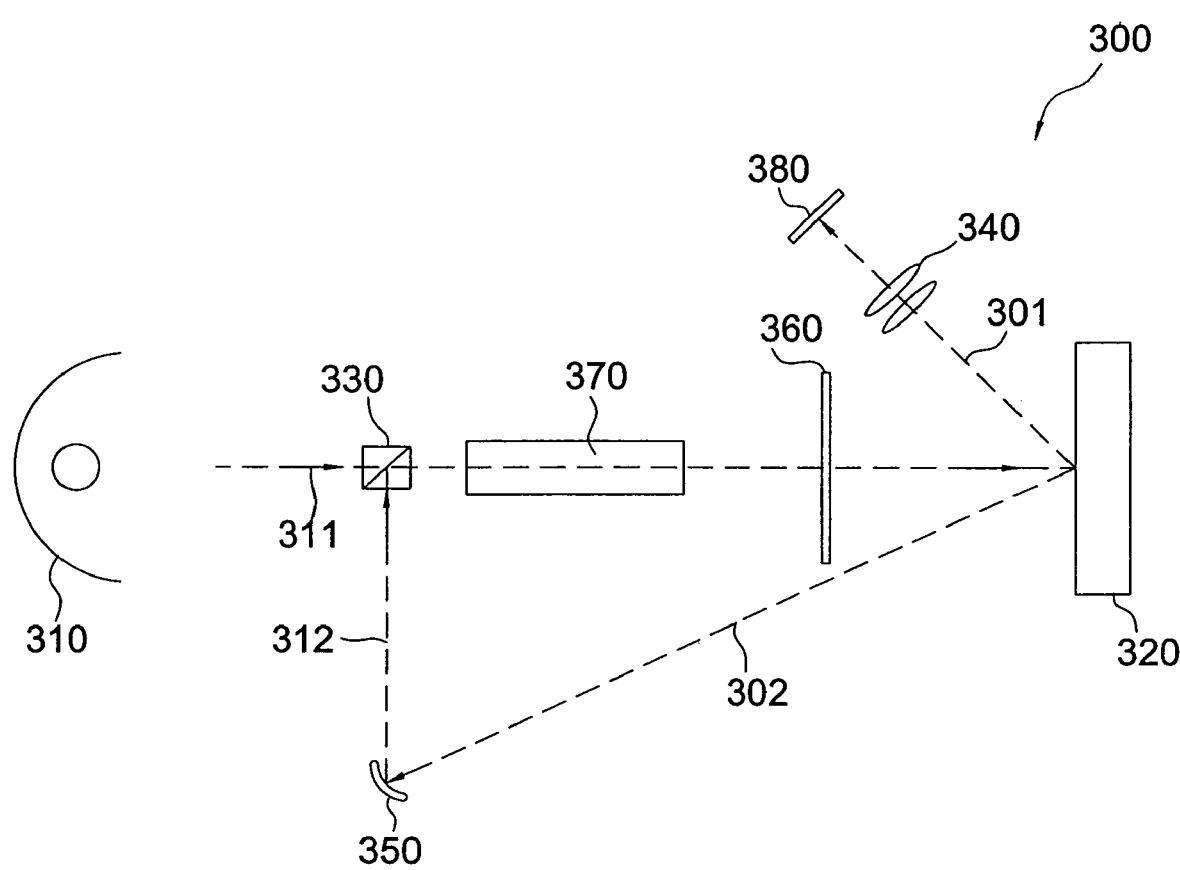
FIG. 3 is a schematic view illustrating an image display apparatus in accordance with another embodiment of the present invention.

Referring to FIG. 2, the present invention provides, in accordance with one embodiment thereof, an image display apparatus 200, which includes a light source 210, a spatial light modulator 220, a total internal reflection prism 230, a projection lens set 240, and a reflector 250. The spatial light modulator 220 is configured to selectively modulate a light beam provided by the light source 210 along a first path 201 to form a first path light beam or along a second path 202 to form a second path light beam. The spatial light modulator 220 can be a micromirror, such as a digital micromirror device (DMD), which is configured to have two states, such as an "on" and an "off" states, by adjusting the deflection angle of the micromirror to selectively reflect an incident light to two different paths. For example, in the "on" state, the spatial light modulator 220 reflects an incident light beam along the first path 201 to form the first path light beam. In the "off" state, the spatial light modulator 220 reflects the incident light beam along the second path 202 to form the second path light beam.

The TIR prism 230 is disposed between the light source 210 and the spatial light modulator 220. The light beam passes through the TIR prism 230 in the first direction 211 and is incident on the spatial light modulator 220, which selectively modulates the light beam to form the first path light beam or the second path light beam. The projection lens set 240 is disposed between the spatial light modulator 220 and a screen 280 so that the first path light beam is projected on the screen 280 to form an image. The reflector 250 can be a concave mirror but is not limited thereto. The reflector 250 is configured to reflect the second path light beam to form a reflected light beam. The reflected light beam is in a second direction 212 and incident on the TIR prism 230 so as to form a recaptured light beam. Then, the recaptured light beam is incident on the spatial light modulator 220 in the first direction 211.

The image display apparatus 200 further includes a color wheel 260, which is disposed between the TIR prism 230 and the spatial light modulator 220 and is configured to filter the light beam, such as the light beam provided by the light source 210 or the recaptured light beam. Furthermore, the image display apparatus 200 includes a light pipe 270 for processing a light beam distribution. It is noted that the TIR prism 230 is preferably disposed between the light source 210 and the color wheel 260 and selectively before or after the light pipe 270.

The exemplary embodiment showing that the TIR prism 230 is disposed after the light pipe 270, is illustrated in FIG. 2. As shown in FIG. 2, the light beam provided by the light source 210 travels through the light pipe 270, which is configured to reflect the light beams therein to reach a predetermined light beam distribution. Then, the distributed light beam is incident into the TIR prism 230 in the first direction 211. The light beam, after passing through the TIR prism 230, is filtered by the color wheel 260 in a selective color (such as one of the primary colors; red, green, or blue), and then incident on the spatial light modulator 220. In response to an image signal, the spatial light modulator 220 adjusts the deflection angle of a micromirror to selectively reflect an incident light to one of two different paths, such as the fist path 201 and the second path 202. For example, in the "off" state, the spatial light modulator 220 reflects the light beam along the second path 202 to form the second path light beam. The second path light beam is then reflected by the reflector 250 so that it is incident on the TIR prism 230 in the second direction 212 to form the recaptured light beam. The recaptured light beam is then incident on the spatial light modulator 220 in the first direction 211. In other words, the TIR prism 230 is capable of allowing light beams to pass from different directions therethrough or to be reflected off in the same direction. Therefore, by implementing the TIR prism 230, the recaptured light beam or the light beam provided by the light source 210 can be filtered by the same color wheel 260 and incident on the spatial light modulator 220. When the spatial light modulator 220 is in the "on" state, the light beam provided by the light source 210 and the recaptured light beam can both be modulated to be the first path light beam, which is then focused and enlarged by the projection lens set 240 to form an image on the screen 280. In other words, the image display apparatus 200 of the present invention is designed with a recycling light path to recapture the "off" state light so as to increase the image brightness and contrast.

Referring to FIG. 3, an image display apparatus 300, in accordance with another embodiment, is illustrated. The image display apparatus 300 has components, such as a light source 310, a spatial light modulator 320, a TIR prism 330, a projection lens set 340, a reflector 350, a color wheel 360, and a light pipe 370 similar to those illustrated in FIG. 2, but in different arrangement. As shown in FIG. 3, the TIR prism 330 is disposed between the light source 310 and the light pipe 370. The light beam provided by the light source 310 is incident on the TIR prism 330 in a first direction 311 and then continuously reflected by the light pipe 370 to reach a light beam distribution. The color wheel 360 is configured to filter the distributed light beams so that only light in a selective color, such as red, green, blue, or white, passes therethrough and the light is then incident on the spatial light modulator 320. In response to an image signal, the spatial light modulator 320 adjusts the deflection angle of a micromirror to selectively modulate the filtered light beam along a first path or along a second path. For example, in the "off" state, the spatial light modulator 320 is configured to modulate the light beam along the second path 312 to form a second path light beam. The second path light beam is then reflected by the reflector 350 so that it is incident on the TIR prism 330 in the second direction 312 to form a recaptured light beam. Then, the recaptured light beam together with the light beam provided by the light source 310 is reflected by the light pipe 370 and travels therethrough to reach a light beam distribution. The distributed light beam is then filtered by the color wheel 360 and incident on the spatial light modulator 320. When the spatial light modulator 320 is in the "on" state, the light beam from the light source 310 and the recaptured light beam can both be modulated to be the first path light beam, which is then focused and enlarged by the projection lens set 340 to form an image on the screen 380. It is noted that the image display apparatus 300 with the TIR prism 330 disposed before the light pipe 370 can reach a more uniform light distribution because of the functionality of the light pipe 370.

The advantages of the present invention include the implement of TIR prism 230 or 330 cooperating with the design of light path so that the "off-state" light is recaptured to improve image brightness and contrast and reduce the heat converted by the "off-state" light in comparison with the prior art, resulting in the feasibility of a large screen projection and the possible variety of projection distances.

Although specific embodiments have been illustrated and described, it will be apparent that various modifications may be made without departing from the scope of the appended claims.

The invention claimed is:

1. An image display apparatus, comprising:
a light source for providing a light beam;
a spatial light modulator configured to selectively modulate said light beam along a first path to form a first path light beam or along a second path to form a second path light beam;
a total internal reflection (TIR) prism, disposed between said light source and said spatial light modulator, for said light beam to pass therethrough in a first direction before being incident on said spatial light modulator;

a projection lens set, disposed between said spatial light modulator and a screen, for projecting said first path light beam on said screen to form a first image; and a reflector for reflecting said second path light beam to form a reflected light beam, wherein said reflected light beam is incident onto said TIR prism in a second direction and reflected, as a recaptured light beam, onto said spatial light modulator in said first direction.

2. The image display apparatus of claim 1, wherein said reflector comprises a concave mirror.

3. The image display apparatus of claim 1, wherein said spatial light modulator comprises a micromirror.

4. The image display apparatus of claim 1, further comprising a color wheel, disposed between said TIR prism and said spatial light modulator, for filtering said recaptured light beam.

5. The image display apparatus of claim 4, further comprising a light pipe, disposed between said light source and said TIR prism, for achieving a distribution of said light beam.

6. The image display apparatus of claim 4, further comprising a light pipe, disposed between said TIR prism and said color wheel, for achieving a distribution of said light beam.

7. An image display apparatus, comprising:

a light source for providing a light beam;

a micromirror configured to selectively modulate said light beam along a first path to form a first path light beam or along a second path to form a second path light beam;

a total internal reflection prism (TIR prism), disposed between said light source and said micromirror, for said light beam to pass therethrough in a first direction before being incident on said micromirror;

a projection lens set, disposed between said micromirror and a screen, for projecting said first path light beam on said screen to form a first image; and a concave mirror for reflecting said second path light beam to form a reflected light beam, wherein said reflected light beam is incident onto said TIR prism in a second direction and reflected, as a recaptured light beam, onto said micromirror in said first direction.

8. The image display apparatus of claim 7, further comprising:

a color wheel, disposed between said TIR prism and said micromirror, for filtering said recaptured light beam; and a light pipe, disposed between said light source and said TIR prism, for achieving a distribution of said light beam.

9. The image display apparatus of claim 7, further comprising:

a color wheel, disposed between said TIR prism and said micromirror, for filtering said recaptured light beam; and a light pipe, disposed between said TIR prism and said color wheel, for achieving a distribution of said light beam.

* * * * *